United States Patent [19]

Ishikawa et al.

[11] Patent Number: 4,749,627
[45] Date of Patent: Jun. 7, 1988

[54] BRAZING SHEET AND HEAT EXCHANGER USING SAME

[75] Inventors: Kazunori Ishikawa, Nikko; Hiroshi Kawase, Imaichi; Tooru Yamaguchi, Isesaki; Mikio Koisuka; Toshio Aoki, both of Gunma, all of Japan

[73] Assignees: Furukawa Aluminum Co., Ltd., Tokyo; Sanden Corporation, Isesaki, both of Japan

[21] Appl. No.: 706,140

[22] Filed: Feb. 27, 1985

[30] Foreign Application Priority Data

Mar. 6, 1984 [JP] Japan ................... 59-41371
Mar. 8, 1984 [JP] Japan ................... 59-42973

[51] Int. Cl.$^4$ ............................................. B32B 15/00
[52] U.S. Cl. ................................. 428/654; 165/177; 420/528; 420/540; 420/552
[58] Field of Search .............. 420/528, 540, 552; 428/654; 165/177

[56] References Cited

U.S. PATENT DOCUMENTS 3,974,055  8/1976  Reding et al. ............... 420/540
4,072,542  2/1978  Murakado et al. ............ 148/11.5 A

FOREIGN PATENT DOCUMENTS 401904  1/1966  Australia .
500987  4/1977  Australia .

OTHER PUBLICATIONS

Aluminum Technology Book 1: Aluminum the Metal by the Aluminum Development Council of Australia Ltd., 1971, pp. 20-21.
"Light Alloys-Metallurgy of the Light Metals", by I. J. Polmear, E. A. Press in the Patent Office Library since 7 Jun. 1983, at pp. 15-16.

Primary Examiner—R. Dean
Attorney, Agent, or Firm—Birch, Stewart, Kolasch & Birch

[57] ABSTRACT

Al and Al alloy materials for a fin are disclosed which contain Fe of 0.2% or less and Si of 0.1% or less and exhibit improved thermal conductivity, sacrificial anode effect and sagging resistance. Also, a heat exchanger having a fin made of the Al and Al alloy material incorporated therein is disclosed. The heat exchanger is lightweight and excellent in corrosion resistance and heat radiation.

11 Claims, 1 Drawing Sheet

BRAZING SHEET AND HEAT EXCHANGER USING SAME

BACKGROUND OF THE INVENTION

1. Field of the Invention

This invention relates to aluminum and aluminum alloy for a fin and a heat exchanger having such a fin incorporated therein by brazing, the invention relates to more particularly, aluminum and aluminum alloy for a fin of which the desired characteristics, particularly, thermal conductivity and the like are highly improved in order to increase the effectiveness or cooling capacity of a heat exchanger, and the application of such aluminum and aluminum alloy material to a heat exchanger.

2. Description of the Prior Art

A heat exchanger having a fin of aluminum or aluminum alloy incorporated therein by brazing (hereinafter referred to as "Al heat exchanger") has been extensively used in various fields involving an automobile, an aircraft and the like. Such a heat exchanger generally comprises a passage means for flowing a refrigerant such as Freon, (Tradename, Fluorohydrocarbon made by Du Pont & Co., Inc.), water or the like therethrough (hereinafter referred to as "tube") and a fin for heat radiation. As the tube, an extruded perforated tube of a flat shape or a flat seam welded tube formed of a brazing sheet having an Al-Si brazing material cladded thereon is selectively used depending upon the use of the heat exchanger. Also, the fin is formed of a alloy sheet 3 comprising a core 1 and an Al-Si brazing clad material 2 cladded on each of both surfaces of the core 1 as shown in FIG. 1 or only the core.

An embodiment of the heat exchanger having a fin formed of Al or Al heat exchanger is shown in FIG. 2. More particularly, FIGS. 2A and 2B show an evaporator and a condenser, respectively, each of which comprises a flat extruded perforated tube 4 and a fin 5 formed of a brazing sheet 3 as shown in FIG. 1. FIG. 2C shows a radiator which comprises a flat seam welded pipe 6 formed of a brazing sheet having an Al-Si brazing material cladded on the outer surface thereof and an unclad fin 7. Such heat exchangers as described above each are assembled by bonding the pipe and corrugated fin together by flux brazing, vacuum brazing or brazing in an inert gas atmosphere at a temperature of about 600° C. using the brazing material previously cladded on the pipe.

In such an Al heat exchanger manufactured by brazing as described above, a fin was typically manufactured using a sheet metal of 0.1–0.2 mm in thickness formed of Al-Mn alloy having good sagging resistance at a high temperature, for example, such as AA 3003 alloy (Registered alloy of Aluminum Association U.S.A. (AA)) (Al, Cu: 0.05–0.20%, Mn: 1.0–1.5 %) or AA 3203 alloy (Al, Mn: 1.0–1.5%). Alternatively, it is made of a sheet metal of 0.1–0.2 mm in thickness which comprises a core material of such Al-Mn alloy as described above and a brazing material of Al-Si alloy (Al, Si: 5–12%) or Al-Si-Mg alloy (Al, Si: 5–12%, Mg: 0.5–2%) cladded on both surfaces of the core material.

However, the fin formed of Al-Mn alloy such as AA 3003 alloy or AA 3203 alloy is somewhat inferior in thermal conductivity although it has good sagging resistance as described above, resulting in the deterioration of heat radiation of a heat exchanger using such a fin.

Recently, weight saving and miniaturization are desired in a heat exchanger, particularly, for an automobile. Further, not only the formation of a fin having a smaller thickness but an improvement in performance of a heat exchanger or effectiveness (e.g. cooling capacity) thereof is requested in the art.

Accordingly, it would be highly desirable to develop a fin for a heat exchanger which has sufficient heat conductivity, does not cause the settling or deformation of the fin during the bonding by brazing and is improved in a so-called sacrificial anode effect of effectively preventing the corrosion of a tube of a heat exchanger.

SUMMARY OF THE INVENTION

The present invention has been made in view of the foregoing disadvantages of the prior art. The inventors have found that the use of Al having Fe and Si contents controlled or regulated below a predetermined level for a fin allows the thermal conductivity of the fin to be significantly improved and the addition of at least one of Zr and Cr or at least one of Zn, Sn and In to the Al material within a predetermined range permits the fin to have satisfied sagging resistance and exhibit an improved sacrificial anode effect.

Generally speaking, in accordance with the present invention, a fin material is provided which is formed of Al or Al alloy of which Fe and Si contents are controlled to be 0.2% or less and 0.1% or less, respectively. Also, in accordance with the present invention, there is provided a heat exchanger using the fin material.

Accordingly, it is an object of the present invention to provide a fin material for a heat exchanger which is capable of preventing the settling and/or deformation of a fin during a brazing operation being improved in the so-called sagging resistance and has significantly improved heat conductivity.

It is another object of the present invention to provide a fin material which is capable of exhibiting excellent sacrificial anode effect as well as improved sagging resistance and thermal conductivity.

It is a further object of the present invention to provide a heat exchanger which is small-sized and lightweight having a thinner fin, but exhibits improved corrosion resistance, and has satisfactory effectiveness for heat exchanging or heat radiation characteristics.

It is still a further object of the present invention to provide a heat exchanger of energy saving or resource saving type being composed of a fin thin and lightweight and a tube improved in corrosion resistance.

Still other objects and advantages of the invention will be apparent from the specification.

Throughout the specification and claims, percentages and ratios are given by weight and temperatures are in degrees Celsius, unless otherwise indicated.

BRIEF DESCRIPTION OF THE DRAWINGS

For fuller understanding of the invention, reference is had to the following description taken in connection with the accompanying drawings, in which:

FIG. 2 is a schematic view showing an Al heat exchanger, wherein

DETAILED DESCRIPTION OF THE INVENTION

Figure 1:
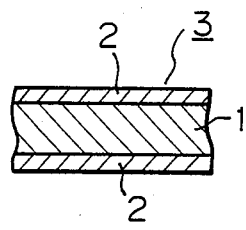
FIG. 1 is a vertical sectional view showing one example of a brazing sheet used for a fin.

Al and Al alloy materials for a fin of a heat exchanger according to the present invention include the following compositions:

(1) Al for a fin of a heat exchanger containing Fe of 0.2% or less, Si of 0.1% or less, and the balance of Al and unavoidable impurities (hereinafter referred to as "first composition");

(2) Al alloy for a fin of a heat exchanger containing Fe of 0.2% or less, Si of 0.1% or less, at least one of Zr of 0.01–0.3% and Cr of 0.01–0.3%, and the balance of Al and unavoidable impurities (hereinafter referred to as "second composition");

(3) Al alloy for a fin of a heat exchanger containing Fe of 0.2% or less, Si of 0.1% or less, at least one of Zn of 0.2–2.0%, Sn of 0.01–0.1% and In of 0.01–0.1%, and the balance of Al and unavoidable impurities (hereinafter referred to as "third composition"); and (4) Al alloy for a fin of a heat exchanger containing Fe of 0.2% or less, Si of 0.1% or less, at least one of Zr of 0.01–0.3% and Cr of 0.01–0.3%, at least one of Zn of 0.2–2.0%, Sn of 0.01–0.1% and In of 0.01–0.1%, and the balance of Al and unavoidable impurities (hereinafter referred to as "fourth composition").

Now, the components of Al and Al alloy of the present invention will be described.

(a) Fe and Si

The limitation of the Fe content to 0.20% or less and the Si content to 0.10% or less in Al and Al alloy of the present invention allows the Al material to have improved thermal conductivity and exhibit excellent sagging resistance during a brazing operation. Such limitation of the Fe and Si contents also permits a core material of a fin material formed of a brazing sheet material to have an increased recrystallized grain size right before brazing. Thus the diffusion of Si contained in the brazing material to the grain boundary of the core material may be effectively decreased to allow the fin to have improved sagging resistance. An excess of the Fe and Si contents over the above-described ranges causes the thermal conductivity and sagging resistance of the fin to be deteriorated.

(b) Zr and Cr

An Al alloy material obtained by adding at least one of Zr of 0.01–0.3% and Cr of 0.01–0.3% to the Al material having Fe and Si contents limited to the above-described ranges exhibits further improved sagging resistance while keeping good thermal conductivity. The Zr and Cr contents below 0.01% do not allow the Al alloy material to have improved sagging resistance, whereas the contents above 0.3% cause the crystallization of intermetallic compound of a large size, to thereby deteriorate plastic workability and thermal conductivity of the Al alloy material. The addition of Zr and/or Cr permits the recrystallization temperature to be high enough to minimize the diffusion of Si in the brazing material right before brazing, to thereby effectively prevent the sagging of a fin to be formed thereof.

(c) Zn, Sn and In

An Al alloy material obtained by adding at least one of Zn of 0.2–2.0%, Sn of 0.01–0.1% and In of 0.01–0.1% to the Al material having such Fe and Si contents limited as described above and the Al material having the above-described amounts of Zr and/or Cr further added thereto exhibit an excellent sacrificial anode effect while maintaining satisfactory thermal conductivity. The Zn, Sn or In content below the above described range does not allow the alloy material to exhibit a desired sacrificial anode effect, whereas the content above the range causes the deterioration of plastic workability and thermal conductivity of the alloy material.

In the present invention, unavoidable impurities such as Cu, Ti, Mn and the like do not cause any disadvantage when the contents are as in Al ingot having an Al content above 99% (Cu: 0.02% or less, Ti: 0.03% and Mn: 0.03%).

Such Al and Al alloy materials as described above for a fin each are formed into a semi-rigid sheet (e.g. H-14 temper sheet), which is used with nothing on or in the form of a brazing sheet having a brazing material cladded on both surfaces thereof. The sheet is generally formed to have a thickness of about 0.1–0.2 mm and a width of about 20–100 mm.

Figure 2A:
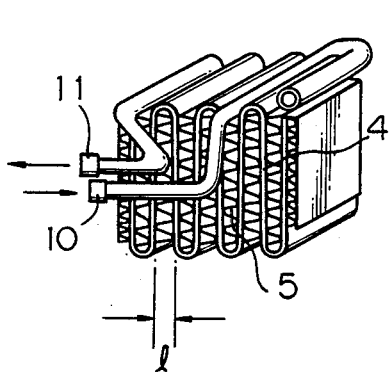
FIG. 2(A) shows an evaporator.
Figure 2B:
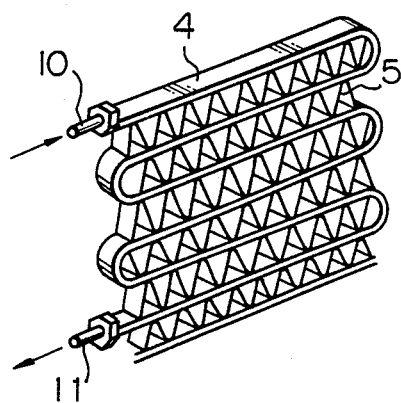
FIG. 2(B) shows a condenser and FIG. 2(C) shows a radiator.
Figure 2C:
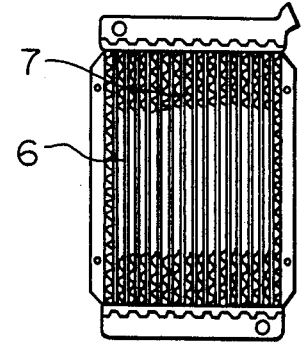

The above-described first and third compositions of the present invention are suitable for use in the manufacture of a fin (width: about 100 mm) for such an evaporator as shown in FIG. 2A. The second and fourth compositions of the present invention are suitable for use in the manufacture of a fin (the width: about 20–40 mm) for a condenser as shown in FIG. 2B or a radiator as shown in FIG. 2C as well as that for an evaporator as shown in FIG. 2A.

The manufacturing of a sheet using the Al or Al alloy material of the present invention is not limited to a specific process and may be carried out by any conventional process. For example, this may be carried out by a process comprising the steps of preparing an Al or Al alloy ingot containing the above-described components, subjecting the ingot to a soaking treatment, hot rolling and then cold rolling the ingot to prepare a rolled material, subjecting the rolled material to intermediate annealing as desired, and finally forming the material into a semi-rigid sheet product.

Now, a heat exchanger manufactured using the Al or Al alloy material according to the present invention will be hereinafter described in detail.

The fourth composition described above is preferably used for a heat exchanger. For example, a preferred heat exchanger has a construction as shown in FIG. 2 wherein a fin 5 is formed of a brazing sheet which comprises a core material of Al alloy containing Fe of 0.2% or less, Si of 0.1% or less, Zr of 0.01–0.3%, Zn of 0.05–1.0%, and the balance of Al and unavoidable impurities and an Al-Si clad material applied thereon and a tube 4 is formed of Al alloy having potential nobler than that of the fin and bonded to the fin.

In the manufacturing of the heat exchanger, the Al-Si alloy clad material 2 cladded on both surfaces of the core material 1 in the brazing sheet 3 of which the fin is formed is (a) Al-Si alloy, for example, such as Al-7.5% Si (AA 4343) or Al-10% Si (AA 4045) in the case of brazing in nonoxidizing atmosphere, or typical brazing and (b) Al-Si-Mg alloy, for example, such as Al-10% Si-1.5% Mg (AA 4004) or Al-10% Si-1.5% Mg-0.1% Bi (AA 4104) in the case of brazing in a vacuum atmosphere.

In general, the brazing sheet used preferably has a thickness of 0.13–0.2 mm and is formed into a corrugated shape. Such a brazing sheet may be manufactured according to any conventional procedure.

The tube in the heat exchanger of the present invention is formed of Al alloy having potential nobler than that of the fin. Al alloy suitable for use for the tube includes, for example, those defined as AA 1050, AA 1100 and AA 3003. In the present invention, Al alloy resembling pure Al such as AA 1050 or AA 1100 is desirably used to improve the effectiveness of the whole heat exchanger because the alloy has satisfactory thermal conductivity.

The width of the fin is varied depending upon the respective uses of the heat exchanger of the present invention for which the fin is to be used and the like, and is not limited to a specific range. Typically, it is about 100 mm in an evaporator and about 18-50 mm in a condenser.

The core consisting of the tube and the corrugated fin is constructed using brazing in a vacuum atmosphere, flux brazing or other suitable brazing. In the light of brazing characteristics and costs, it is most preferably carried out by brazing at a temperature of about 600°-610° C. in a $N_2$ atmosphere using a small amount of potassium fluoroaluminate complex salt.

The heat exchanger of the present invention may be constructed according to a conventional manner known in the art except for the combination of the fin and tube described above. In FIG. 2, reference numeral 10 and 11 designate pipes for an inlet and outlet provided at both ends of the tube, respectively. Also, an arrow indicates the direction of flow of a refrigerant.

The evaluation of thermal conductivity of the fin in the present invention may be made as follows.

(1) The thermal conductivity is estimated on the basis of electric conductivity measured because thermal conductivity of a material is generally proportional to the electric conductivity.

(2) The thermal conductivity is estimated on the basis of the measured effectiveness or cooling capacity of a heat exchanger constructed using the fin made of such a sheet material as described above.

Also, the heat exchanging characteristics of the heat exchanger are evaluated in a manner similar to the above.

The invention will be more readily understood with reference to the following examples; however, these examples are intended to illustrate the invention and are not to be construed to limit the scope of the invention.

EXAMPLE 1

Al and Al alloys were prepared by melting compositions shown on TABLE 1 listed below according to a conventional melting procedure and preparing an ingot from each of the molten compositions by water cooling. The Al and Al alloy materials listed on Table 1 each contained Cu of 0.04% or less, Ti of 0.03% or less and Mn of 0.03% or less (1.1% in the conventional alloy) as unavoidable impurities.

Then, each of the so-formed ingots was subjected to a soaking treatment at a temperature of 550° C. for three hours and ground at both surfaces thereof, and a sheet made of 4045 brazing material (Al-0.9% Si alloy) was cladded on both surfaces thereof. This was heated to a temperature of 500° C. and subjected to hot rolling to prepare a clad plate of 5 mm in thickness. Subsequently, the clad plate was subjected to cold rolling to prepare a intermediate clad sheet of 0.2 mm in thickness, which was subjected to intermediate annealing at a temperature of 360° C. for two hours and then cold rolling to obtain a final clad sheet for a fin which has a thickness of 0.16 mm (cladding ratio of brazing material on one surface: 10%).

A sample was prepared from each of the final clad sheets and used for the measuring of electric conductivity and sagging resistance characteristics. The result was as shown in TABLE 2 listed below.

Figure 3:
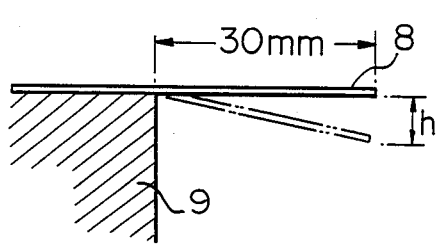
FIG. 3 is a schematic view showing one example of an apparatus for a sagging resistance test.

Electric conductivity in TABLE 2 is relative to that (100%) of pure copper. The measurement of degree of sagging was carried out by heating a specimen of 22 mm in width and 50 mm in length which was projected at one end thereof by 30 mm and fixed at the other end thereof on a fixture as shown in FIG. 3 and measuring the degree of sagging of the free end due to the heating. In TABLE 2, ⊚ indicates that the degree of sagging of 2 mm or less, ○ indicates that it is between above 2 mm and 5 mm or below, and x indicates that it is above 5 mm.

Further, materials for a fin which is formed of only a core material and does not have AA 4045 brazing material cladded thereon were prepared and the electric conductivity and degree of sagging of each of the material were measured. The results were as shown in TABLE 3.

TABLE 1

| | Sample No. | Fe | Si | Zr | Cr | Mn | Zn | Sn | In | Al |
|---|---|---|---|---|---|---|---|---|---|---|
| A(1) | 1 | 0.05 | 0.05 | — | — | — | — | — | — | Balance |
| | 2 | 0.10 | 0.08 | — | — | — | — | — | — | Balance |
| | 3 | 0.20 | 0.10 | — | — | — | — | — | — | Balance |
| | 4 | 0.15 | 0.08 | 0.02 | — | — | — | — | — | Balance |
| | 5 | 0.15 | 0.08 | 0.10 | — | — | — | — | — | Balance |
| | 6 | 0.15 | 0.08 | 0.25 | — | — | — | — | — | Balance |
| | 7 | 0.15 | 0.08 | — | 0.15 | — | — | — | — | Balance |
| | 8 | 0.05 | 0.05 | — | — | — | 0.6 | 0.04 | — | Balance |
| | 9 | 0.10 | 0.08 | — | — | — | — | 0.005 | 0.05 | Balance |
| | 10 | 0.10 | 0.08 | — | — | — | 1.1 | — | — | Balance |
| | 11 | 0.02 | 0.10 | — | — | — | — | 0.05 | — | Balance |
| | 12 | 0.15 | 0.08 | 0.10 | — | — | 1.0 | — | — | Balance |
| | 13 | 0.15 | 0.08 | — | 0.15 | — | 0.5 | 0.04 | — | Balance |
| | 14 | 0.15 | 0.08 | 0.10 | — | — | — | 0.05 | — | Balance |
| | 15 | 0.15 | 0.08 | 0.10 | — | — | — | 0.05 | 0.05 | Balance |
| B(2) | 16 | 0.25 | 0.15 | — | — | — | — | — | — | Balance |
| | 17 | 0.40 | 0.30 | — | — | — | — | — | — | Balance |
| | 18 | 0.15 | 0.08 | — | — | — | 3 | — | — | Balance |
| | 19 | 0.15 | 0.08 | — | — | — | — | 0.3 | — | Balance |
| | 20 | 0.15 | 0.08 | 0.5 | — | — | — | — | — | Balance |
| | 21 | 0.3 | 0.15 | — | — | — | — | — | — | Balance |
| | 22 | 0.6 | 0.30 | — | — | — | — | — | — | Balance |
| C(3) | 23 | 0.6 | 0.2 | — | — | 1.1 | — | — | — | Balance |

TABLE 1-continued

| Sample No. | Chemical Composition (%) | | | | | | | | |
|---|---|---|---|---|---|---|---|---|---|
| | Fe | Si | Zr | Cr | Mn | Zn | Sn | In | Al |
| (3203) | | | | | | | | | |

Notes:
[1]A: Alloys of the present invention
[2]B: Alloys for comparison
[3]C: Prior art alloy The same rule applies correspondingly to the following Tables.

TABLE 2

| Sample No. | Electric Conductivity of Clad Material for Fin (%) | Sagging Resistance Characteristics of Clad Material for Fin (Degree of Sagging) |
|---|---|---|
| A 1 | 56 | ○ |
| 2 | 55 | ○ |
| 3 | 54 | ◎ |
| 4 | 52 | ◎ |
| 5 | 51 | ◎ |
| 6 | 50 | ◎ |
| 7 | 51 | ◎ |
| 8 | 54 | ○ |
| 9 | 53 | ○ |
| 10 | 52 | ○ |
| 11 | 54 | ○ |
| 12 | 52 | ◎ |
| 13 | 53 | ◎ |
| 14 | 51 | ◎ |
| 15 | 52 | ◎ |
| B 16 | 52 | X |
| 17 | 51 | X |
| 18 | 45 | X |
| 19 | * | — |
| 20 | * | — |
| 21 | 52 | X |
| 22 | 51 | X |
| C 23 (3203) | 40 | ◎ |

*Alloy could not be manufactured.

TABLE 3

| Sample No. | Electric Conductivity of Unclad Material for Fin (%) | Sagging Resistance Characteristics of Unclad Material for Fin (Degree of Sagging) |
|---|---|---|
| A 1 | 62 | ○ |
| 2 | 61 | ○ |
| 3 | 60 | ◎ |
| 4 | 58 | ◎ |
| 5 | 57 | ◎ |
| 6 | 56 | ◎ |
| 7 | 57 | ◎ |
| 8 | 60 | ○ |
| 9 | 59 | ○ |
| 10 | 58 | ○ |
| 11 | 60 | ○ |
| 12 | 58 | ◎ |
| 13 | 59 | ◎ |
| 14 | 57 | ◎ |
| 15 | 58 | ◎ |
| B 16 | 58 | X |
| 17 | 57 | X |
| 18 | 51 | X |
| 19 | * | — |
| 20 | * | — |
| 21 | 58 | X |
| 22 | 57 | X |
| C 23 (3203) | 46 | ◎ |

*Alloy could not be manufactured.

EXAMPLE 2

The Al and Al alloy sheets prepared in Example 1 (Nos. 1-15 (present invention) and 23 (prior art)) were used for the manufacture of such an evaporator having a corrugated fin as shown in FIG. 2A. The width of a fin was 100 mm, a tube was an extruded one formed of 1050 pure Al, formed with 20 holes and had a wall thickness of 0.8 mm, and brazing was carried out using fluoride flux in an inert gas atmosphere.

With respect to the so-constructed evaporator, the cooling capacity of a core, the sagging resistance of the fin and the maximum depth of pitting of the tube by a corrosion test were measured. A test concerning the cooling capacity was carried out on fin material Sample Nos. 1, 3, 5, 7, 8, 11, 13, 15 and 23.

The tests and criteria were as follows.

(1) Cooling capacity test

The test was carried out according to JIS D 1618 which defines a test for an automobile cooler.

(2) Fin sagging resistance test

Supposing that there is no brazing failure between a fin and an extruded tube during the brazing, a comparison was made between the interval (22 mm) of the bent tube prior to the brazing and that thereafter. "Good" in TABLE 4 listed below indicates that the decrease in interval of the tube is 0.3 mm or less.

(3) Corrosion test

A CASS test (copper-accelerated acetic acid salt spray test) was carried out for 720 hours (1 month) under the conditions that a core was charged with $N_2$ gas under pressure of 15 kg/cm$^2$ to compare time to pressure leakage. When there was no pressure leakage, a comparison was made on the maximum depth of pitting of the tube.

The results of the tests were as shown in TABLE 4.

TABLE 4

| | Result of Test, Using Core of Heat Exchanger | | |
|---|---|---|---|
| Sample No. | Cooling Capacity Improvement against Sample No. 23 | Sagging Resistance of Fin | Time to cause Pressure Leakage or Maximum Depth of Pitting of Tube |
| A 1 | 4.0% | ○ | 0.52 mm |
| 2 | — | ○ | 0.48 mm |
| 3 | 3.5% | ○ | 0.47 mm |
| 4 | — | ○ | 0.50 mm |
| 5 | 3% | ○ | 0.45 mm |
| 6 | — | ○ | 0.48 mm |
| 7 | 3% | ○ | 0.48 mm |
| 8 | 3% | ○ | 0.21 mm |
| 9 | — | ○ | 0.23 mm |
| 10 | — | ○ | 0.25 mm |
| 11 | 3.5% | ○ | 0.19 mm |
| 12 | — | ○ | 0.25 mm |
| 13 | 3% | ○ | 0.18 mm |
| 14 | — | ○ | 0.19 mm |
| 15 | 3% | ○ | 0.18 mm |
| C 23 (3203) | Standard | ○ | 500 Hr |

EXAMPLE 3

Sample Nos. 4-7, 12-15 and 23 of Al alloy sheets prepared in Example 1 were used to manufacture a condeser as shown in FIG. 2B. The width of a fin of the condenser was 22 mm; a tube thereof was formed of pure Al 1050 by extrusion, provided with four holes and had a wall thickness of 0.8 mm; and brazing was carried out using fluoride flux in an inert gas atmosphere. The sagging resistance of the fin of each of the so-constructed condensers was examined according to the procedure of Example 2. A cooling capacity test was made on Sample Nos. 4, 6, 12, 14 and 23.

The results were as shown in TABLE 5.

TABLE 5

| | | Result of Test, Using Core of Heat Exchanger | |
|---|---|---|---|
| Sample No. | | Cooling Capacity Improvement against Sample No. 23 | Sagging Resistance of Fin |
| A | 4 | 3% | ○ |
| | 5 | — | ○ |
| | 6 | 3% | ○ |
| | 7 | — | ○ |
| | 12 | 3% | ○ |
| | 13 | — | ○ |
| | 14 | 3% | ○ |
| | 15 | — | ○ |
| C | 23 (3203) | (Standard) | ○ |

As can be seen from TABLES 1–5, the Al material of the first composition according to the present invention can provide a fin material which does not cause the settling and/or deformation of a fin during brazing of the fin and is significantly improved in thermal conductivity and sagging resistance. This allows a heat exchanger to be provided which exhibits improved heat radiation characteristics, and small-sized and lightweight.

Further, the Al alloys of the second to fourth compositions according to the present invention can provide a fin material which exhibits not only satisfactory thermal conductivity but improved sagging resistance and sacrificial anode effect, to thereby render the manufacturing of a fin possible which has a much smaller wall thickness. This results in a small-sized and lightweight heat exchanger being provided which exhibits excellent mechanical strength and corrosion resistance and is improved in heat radiation characteristics.

EXAMPLE 4

Al alloys having compositions shown in TABLE 6 listed below were cast using a conventional melting procedure to prepare ingots. Then, a core material to be rolled was prepared from each of the ingots according to a conventional method. The Al alloys each contained, as unavoidable impurities, Cu of 0.02% or less (Cu of 0.15% in Sample No. 22), Ti of 0.03% or less and Mn of 0.03% or less (Mn of 1.1% in Sample Nos. 21 and 22).

Then, a sheet of AA 4045 alloy (Al-10% Si) was cladded on both surfaces of each of the core materials at a cladding ratio of 10% per each surface, and the clad core material was subjected to hot rolling, cold rolling, intermediate annealing and further cold rolling in order to prepare a brazing sheet (semi-rigid) of 0.16 mm in thickness for a fin. A specimen of each of the brazing sheets having dimensions of 0.16 mm in thickness and 100 mm in width was heated at a brazing temperature of 600° C. for three minutes and then the electric conductivity (IACS%) was measured to evaluate the thermal conductivity. The results are shown in TABLE 6.

Further, such specimens or fin materials each were subjected to corrugation working and bonded to a flat perforated tube which was formed of AA 1050 alloy to have a wall thickness of 0.8 mm and a width of 100 mm by hot extrusion and bent in a zigzag shape in a manner as shown in FIG. 2A. The combination was fixedly held by a fixture and subjected to brazing at a temperature 610° C. in an $N_2$ gas atmosphere using a small amount of potassium fluoroaluminate complex salt ($KAlF_4$-$K_3AlF_6$) as flux to manufacture an evaporator as shown in FIG. 2A.

A sagging resistance test was made to study the sagging resistance of the fin during brazing. The results were as shown in TABLE 6. "Bad" in TABLE 6 indicates deformation of the fin to the degree that it is not suitable for use.

A test for the heat exchanging characteristics or cooling capacity was carried out at an air flow of 350 $m^3$/hr according to JIS D1618 which defines a procedure of a test for an automobile cooler.

Corrosion resistance was evaluated by carrying out a CASS test for 720 hours and measuring the depth of pitting occurring on the tube. The maximum depth of the pitting is shown in TABLE 6, wherein the core is regarded to have good corrosion resistance when the maximum depth of the pitting is 0.1 mm or below. Also, heat exchangers B for reference and conventional ones C were tested in the same manner and the results are also shown in TABLE 6.

TABLE 6

| Heat Exchanger No. | | Composition of Alloy for Core of Fin (%) | | | | | Electric Conductivity of Fin (IACS, %) | Result of Test; Using Core of Heat Exchanger | | |
|---|---|---|---|---|---|---|---|---|---|---|
| | | Fe | Si | Zr | Zn | Al | | Sagging Resistance of Fin | Maximum Depth of Pitting of Tube (mm) | Cooling Capacity (kcal/hr) |
| A | 1 | 0.20 | 0.08 | 0.08 | 0.5 | Bal. | 52 | Good | 0.01 | 3930 |
| | 2 | 0.10 | 0.08 | 0.08 | 0.5 | Bal. | 53 | Good | 0.01 | 3960 |
| | 3 | 0.05 | 0.08 | 0.08 | 0.5 | Bal. | 54 | Good | 0.01 | 4000 |
| | 4 | 0.15 | 0.10 | 0.08 | 0.5 | Bal. | 53 | Good | 0.01 | 3960 |
| | 5 | 0.15 | 0.05 | 0.08 | 0.5 | Bal. | 54 | Good | 0.01 | 4000 |
| | 6 | 0.15 | 0.08 | 0.01 | 0.5 | Bal. | 54 | Good | 0.01 | 4000 |
| | 7 | 0.15 | 0.08 | 0.05 | 0.5 | Bal. | 53 | Good | 0.01 | 3960 |
| | 8 | 0.15 | 0.08 | 0.2 | 0.5 | Bal. | 51 | Good | 0.01 | 3940 |
| | 9 | 0.15 | 0.08 | 0.3 | 0.5 | Bal. | 50 | Good | 0.01 | 3920 |
| | 10 | 0.15 | 0.08 | 0.08 | 0.05 | Bal. | 55 | Good | 0.10 | 4000 |
| | 11 | 0.15 | 0.08 | 0.08 | 0.10 | Bal. | 55 | Good | 0.08 | 4100 |
| | 12 | 0.15 | 0.08 | 0.08 | 0.8 | Bal. | 54 | Good | 0.01 | 4000 |
| | 13 | 0.15 | 0.08 | 0.08 | 1.0 | Bal. | 50 | Good | 0.01 | 3920 |
| B | 14 | 0.50 | 0.08 | 0.08 | 0.5 | Bal. | 45 | Good | 0.01 | 3700 |
| | 15 | 0.20 | 0.15 | 0.08 | 0.5 | Bal. | 45 | Good | 0.01 | 3700 |
| | 16 | 0.50 | 0.20 | 0.08 | 0.5 | Bal. | 44 | Good | 0.01 | 3600 |
| | 17 | 0.20 | 0.08 | 0.005 | 0.5 | Bal. | 52 | Bad | 0.01 | 3940 |

TABLE 6-continued

| Heat Exchanger No. | | Composition of Alloy for Core of Fin (%) | | | | Electric Conductivity of Fin (IACS, %) | Result of Test; Using Core of Heat Exchanger | | |
|---|---|---|---|---|---|---|---|---|---|
| | | Fe | Si | Zr | Zn | Al | | Sagging Resistance of Fin | Maximum Depth of Pitting of Tube (mm) | Cooling Capacity (kcal/hr) |
| | 18 | 0.20 | 0.08 | 0.4 | 0.5 | Bal. | 44 | Good | 0.01 | 3650 |
| | 19 | 0.15 | 0.08 | 0.08 | 0.02 | Bal. | 53 | Good | 0.50 | 3950 |
| | 20 | 0.15 | 0.08 | 0.08 | 2.0 | Bal. | 44 | Good | 0.01 | 3650 |
| C | 21 | 0.60 | 0.30 | Mn 1.1 | — | Bal. | 40 | Good | 0.75 | 3600 |
| | 22 | 0.60 | 0.20 | Mn 1.1 | Cu 0.15 | Bal. | 40 | Good | 0.80 | 3600 |

As can be seen from the results shown in TABLE 6, in the heat exchanger of the present invention (Sample Nos. 1-13), the electric conductivity of the fin is 50% or more based on that of pure copper and improved by 25% or more as compared with that of the conventional heat exchanger (Sample Nos. 21 and 22). Also, the core of the heat exchanger of the present invention has a cooling capacity of 3900 kcal/hr or more, which is improved by about 9% or more as compared with the conventional one. Further, it will be noted that in the heat exchanger of the present invention, the fin exhibits improved sagging resistance and a satisfactory sacrificial anode effect on the tube as is apparent from the fact that the maximum depth of pitting of the tube is decreased to 0.1 mm or less. This indicates that the heat exchanger of the present invention has durability of several times as much as the conventional one.

Also, TABLE 6 reveals that the heat exchanger for reference is generally inferior to that of the present invention. More particularly, in Sample Nos. 14-16, 18 and 20, the electric conductivity of the fin is below 50% based on that of pure copper and the cooling capacity makes little difference from that of the conventional heat exchanger. The sagging of the fin occurred in Sample No. 17 and deep pitting of a tube was observed in Sample 19.

Thus, it will be noted that the Al alloy heat exchanger of the present invention exhibits not only excellent heat exchanging characteristics but improved pitting corrosion resistance while keeping the sagging resistance of the fin. Accordingly, it may be suitable for use as resource saving and energy saving heat exchanger.

It will thus be seen that the objects set forth above, and those made apparent from the preceding description, are efficiently attained and, since certain changes may be made in the light of the above teachings without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An Al alloy heat exchanger comprising:
a corrugated fin having a face and a back side and is formed of a brazing sheet containing a core sheet and an Al-Si alloy clad material clad onto both sides of said core sheet, said core sheet being formed of Al alloy which consists essentially of Fe of 0.2 wt. % or less, Si or 0.1 wt. % or less, at least one of Zr of 0.01-0.3 wt. % or Cr of 0.01-0.3 wt. %, at least one of Zn of 0.2-2.0 wt. %, Sn of 0.01-0.1 wt. % or In of 0.01-0.1 wt. %, and the balance of Al and unavoidable impurities; and
a perforated tube formed of Al alloy having potential nobler than that of said fin and said perforated tube being joined by brazing to said fin.

2. An Al alloy heat exchanger comprising:
a fin formed of a brazing sheet comprising a core material and an Al-Si alloy clad material cladded on said core material, said core material being formed of Al alloy which consists essentially of Fe of 0.2 wt. % or less, Si or 0.1 wt. % or less, Zr of 0.01-0.3 wt. %, Zn of 0.05-1.0 wt. %, and the balance of Al and unavoidable impurities; and
a tube formed of Al alloy having potential nobler than that of said fin and joined to said fin.

3. A brazing sheet for a fin of a heat exchanger, comprising:
a core sheet of an Al alloy material consisting essentially of Fe of 0.2 wt. % or less and Si of 0.1 wt. % or less, at least one of Zr of 0.01 to 0.3 wt. % or Cr of 0.01 to 0.3 wt. %, at least one of Zn of 0.2 to 2.0 wt. %, Sn of 0.01 to 0.1 wt. % or In of 0.01 to 0.1 wt. %, and the balance of Al and unavoidable impurities; and
an Al-Si alloy clad material clad onto both sides of the core sheet.

4. The Al alloy heat exchanger as set forth in claim 1, wherein said core sheet is formed of Al alloy which comprises Fe of 0.2 wt. % or less, Si of 0.1 wt. % or less, Zr of 0.01 to 0.3 wt. %, Zn of 0.2 to 1.0 wt. %, at least one of Sn of 0.01 to 0.1 wt. % or In or 0.01 to 0.1 wt. % and the balance of Al and unavoidable impurities.

5. The Al alloy heat exchanger as set forth in claim 1, wherein said core sheet is formed of an Al alloy which comprises Fe of 0.2 wt. % or less, Si of 0.1 wt . % or less, Zr of 0.01 to 0.3 wt. %, at least one of Sn of 0.01 to 0.1 wt. % or In of 0.01 to 0.1 wt. % and the balance of Al and unavoidable impurities.

6. The brazing sheet for a fin of a heat exchanger as set forth in claim 3, wherein the unavoidable impurities are selected from the group consisting of Cu, Ti and Mn.

7. The brazing sheet for a fin of a heat exchanger as set forth in claim 3, wherein the aluminum content of the brazing sheet is at least 99 wt. %.

8. The brazing sheet for a fin of a heat exchanger as set forth in claim 3, wherein the brazing sheet has a thickness of about 0.1 to 0.2 mm.

9. The brazing sheet for a fin of a heat exchanger as set forth in claim 3, wherein the brazing sheet is corrugated.

10. The brazing sheet for a fin of a heat exchanger as set forth in claim 3, wherein the Al-Si alloy is selected from the group consisting of Al and 7.5% Si, Al and 10 wt. % Si and Al-Si-Mg.

11. The brazing sheet for a fin of a heat exchanger as set forth in claim 10, wherein the Al-Si-Mg alloy is Al-10 wt. % Si-1.5 wt. % Mg or Al, 10 wt. % Si, 1.5 wt. % Mg, 0.1 wt. % Bi.

* * * * *